Figure 6:
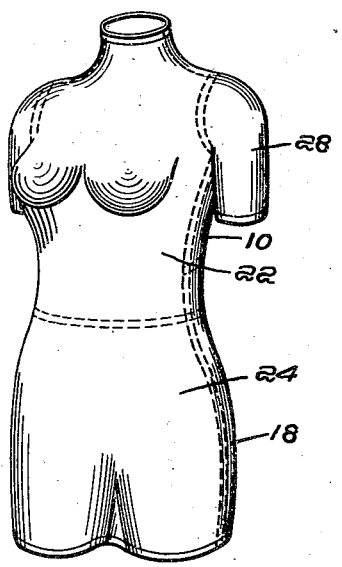

June 2, 1942.  H. H. STRAW  2,285,064
DRESS FORM AND PROCESS OF MAKING THE SAME
Filed April 3, 1940   2 Sheets-Sheet 1
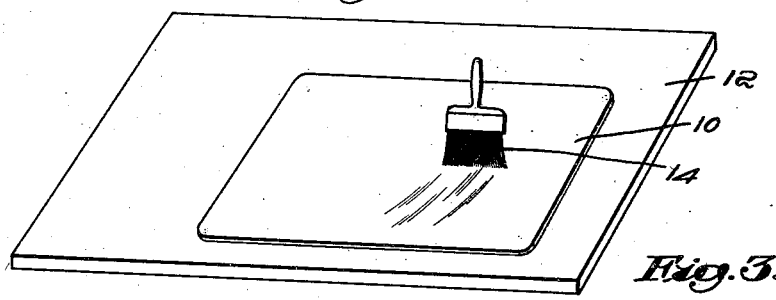
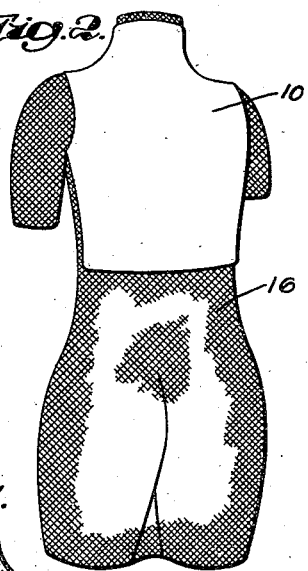 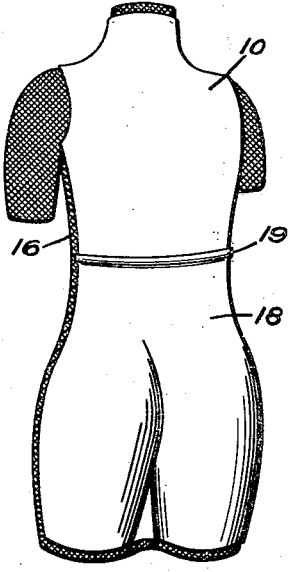
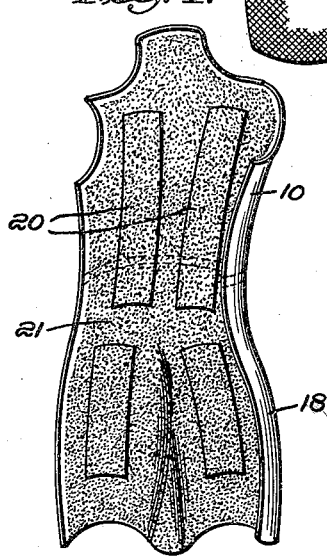 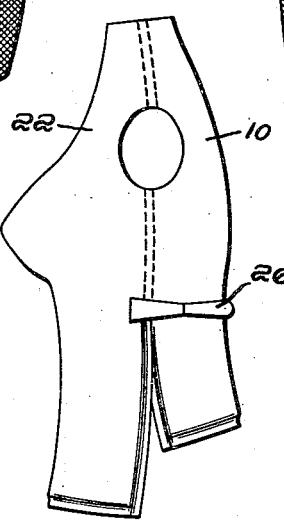

June 2, 1942. H. H. STRAW 2,285,064
DRESS FORM AND PROCESS OF MAKING THE SAME
Filed April 3, 1940 2 Sheets-Sheet 2

Inventor:
Harry H. Straw
by Kenway & Witter
Attorneys

Patented June 2, 1942

2,285,064

UNITED STATES PATENT OFFICE 2,285,064

DRESS FORM AND PROCESS OF MAKING THE SAME

Harry H. Straw, Boston, Mass., assignor to Beckwith Manufacturing Company, Dover, N. H., a corporation of New Hampshire Application April 3, 1940, Serial No. 327,645

14 Claims. (Cl. 223—68)

This invention relates to dress forms of the type produced by conforming thermoplastic sheet material to living models and in one aspect consists in improvements in the process disclosed in the copending application of S. P. Lovell, Ser. No. 336,187. The invention also includes within its scope the novel dress form herein shown as produced by carrying out my improved process.

It is extremely desirable in molding a thermoplastic form to a living model that, out of consideration of the physical comfort and nervous reaction of the model, the operation be reduced to the shortest possible interval of time. I have discovered that very desirable results in this respect may be achieved by employing a plurality of sections or panels of plastic sheet material, separately conforming and temporarily securing these in place upon a close fitting undergarment worn by the model but without permanently uniting the panels until after they have been removed. This avoids the necessity of cutting a complete form in order to remove it from the model and also affords opportunity to treat the individual conformed panels or sections before they are assembled and united in a closed structure.

One satisfactory way of effecting the desired results consists in coating the heated and plasticized panels with a lubricating solution, such as liquid soap, immediately before applying them to the model. The individual panels may thus be accurately conformed to the model and will be held in place thereon by adhering temporarily to the undergarment, but the panels do not fuse in their overlapping areas. On the contrary, a shallow channel may be molded in the edge of the overlapping panels and this serves as a gauge or match mark by which the panels may be reassembled in correct relation after they have been removed from the model. After the panels have been hardened or stiffened and removed, their concave surfaces are exposed and fully available for reinforcement or for treatment by coating.

An important feature of the form of my invention consists in a hardened or stiffened thermoplastic shell coated on one or both sides with a heat resistant material forming a film which reinforces and safeguards the form structure against being distorted by excessive temperature which may be encountered in attic storage space, for example. The plastic material preferably used in carrying out my invention is similar to that disclosed in said application Ser. No. 336,187 above referred to. Out of consideration for the comfort of the model this must become fully plastic and pliable at a moderately elevated temperature, for example, 140 to 150° F. and must stiffen when cooled to room temperature. This material, therefore, is responsive to temperature conditions unless reinforced and safeguarded by the application of a heat resistant coating. Various heat impervious paints or lacquers will serve the purpose of my invention. Water soluble compounds such as glue, starch, gelatine, dextrine and the like may also be employed, but the best solution now known to me is a solution of sodium silicate which I will disclose more particularly hereinafter.

The material which I prefer to employ consists in a knitted textile base having distributed thereon a homogeneous composition of vegetable wax, rubber and resin. This material softens at a temperature between 140° and 150° F. and hardens when cooled between these temperatures and about 100°. Two other important advantages result from the use of this material, in the construction of dress forms. In the first place the resulting form reproduces the living model with an increase in dimensions such that it may be use to fit a dress accurately thereon with just the clearance needed for comfortable wear. It is apparent that if a dress is made which conforms exactly to the dimensions of the living model it will not have the clearance necessary for comfort. An increase in girth of about 1" is necessary in the dimensions of a dress compared to the actual body of the model. In producing a form from the material herein disclosed, and by the steps outlined, this necessary increase in dimensions is secured without any further attention to the matter.

In the second place the material of the resulting dress form is pinable to a remarkable degree, that is to say, the material is somewhat clinging and self-healing so that dress parts may be pinned to the form again and again in substantially the same place without the formation of holes which will not retain the pin. This property is preserved in the completed form by heat-resisting and moisture-resisting coatings applied after the formation of the panel sections.

Figure 7:
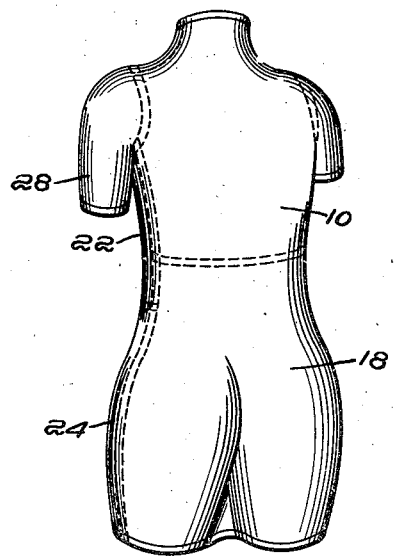
Figure 8:
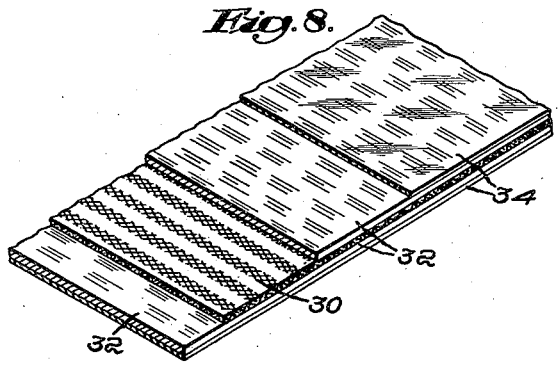

These and other features of the invention and characteristics of the process will be best understood and appreciated from the following description of one manner in which the process may be put into effect as set forth in the following specific description and illustrated in the accompanying drawings in which, Fig. 1 is a view in perspective illustrating the steps of softening a panel of thermoplastic sheet material upon a steam plate and simultaneously coating it with a lubricant, Fig. 2 is a view in perspective of a model with the upper back panel in place, Fig. 3 is a similar view showing the addition of the lower back panel, Fig. 4 is a view in perspective of the two back panels removed from the model and united, Fig. 5 is a view in elevation suggesting the operation of connecting the back and front sections of the form, Fig. 6 is a view in perspective of the completed form as seen from the front, Fig. 7 is a similar view as seen from the rear, and Fig. 8 is a fragmentary view on a much enlarged scale of the sheet material from which the form is made.

In carrying out my invention I first provide thermoplastic sheet material in the form of flat sections or panels normally stiff but capable of being rendered limp or plastic by moderate heat so that it may be molded closely to the body of the living model without discomfort, and having the capacity of stiffening in molded form when cooled to room temperature. A satisfactory material is provided by saturating a backing of knitted fabric with a composition of vegetable wax, rubber, beeswax, and resin, or by spreading or distributing the compound thereon.

A preferred formula includes:

| | Parts |
|---|---|
| Candelilla wax | 30 |
| Rubber | 10 |
| Resin or rosin | 50 |
| Beeswax | 10 |

A satisfactory procedure for preparing this sheet material is contained in application Ser. No. 336,187 to which reference has already been made. The sheet material may be cut into panels of any desired shape and size. They may be substantially rectangular as suggested in Fig. 1 or they may conform more or less in contour to selected parts of the body. In Fig. 1 a rectangular panel 10 about 18"x20" is shown in position upon a steam plate 12 whereon it may be warmed sufficiently to render it limp and plastic. Meanwhile the model has been provided with a close fitting knitted under garment 16. When the panel has become thoroughly warmed and softened a coating of liquid soap is preferably applied by a brush 14 or any other suitable means to its upper surface and a continuous and interrupted film thus supplied. The coated panel is then taken by its corners and draped about the back and shoulders of the model, as shown in Fig. 2, being smoothed into accurate conformity with the model so that it fits accurately thereto. In this operation it will be found that the panel 10 will adhere lightly to the fabric of the under garment 16, that is to say, it will adhere sufficiently so that it will remain in position thereon although when cooled and stiffened it may be readily stripped without any incidental deformation in shape.

A lower back panel 18 of similar shape may now be heated, softened and coated as already explained and then applied to the model as suggested in Fig. 3 with its upper edge slightly overlapping the lower edge of the upper panel 10. The panel 18 as in the previous instance is conformed accurately to the contour of the model. On account of its coating of lubricant there is slight, if any, cohesion between the overlapping edges of the two panels although both are retained in place by slight adhesion to the fabric of the undergarment 16. In conforming the panel 18 upon the model a shallow channel will be formed in the overlapping portion of its upper edge as evidenced by the circumferential rib 19 shown in Fig. 3 in somewhat exaggerated relief.

Having placed and conformed panels 10 and 18 as suggested in Fig. 3, they may be match-marked in position or the channel within the rib 19 may be relied upon as a match mark. In conforming the upper and lower panels 10 and 18 the edges may be trimmed as desired or convenient, particularly the longitudinal edges and the edges about the arms and neck.

The front upper panel 22 and then the front lower panel 24 may now be similarly heated, coated with lubricant, and conformed to the model and in this operation the side edges of the front panels are overlapped upon the longitudinal edges of the rear panels. During the conforming operation these panels also may be trimmed so that the overlap is reduced to about ¾" and to improve the fit about the neck and arms. Smaller panels may also be heated and conformed to form arm portions 26 and all of the panels are allowed to harden collectively on the model and then they may be match-marked at their overlapping edges to facilitate later reassembling of the constituent parts.

The separate and conformed panels are now removed one by one from the model and their meeting edges may now be trimmed in accordance with the match marking on the panels or in accordance with the indication of the channels formed at the overlapping edges. It is convenient in some instances to trim the overlapped edges on a single line in adapting them to be united in a butt joint. In any case, however, the conformed back, upper and lower panels 10 and 18 are joined at their common circumferential edge by fusing together either with a slight overlap or in butted relation. Reinforcing strips 20 of the sheet material are cut, warmed, and fused to the inner surface of the conformed panels 10 and 18 as shown in Fig. 4. The reinforcing strips are so located as to bind the line of juncture between the sections and also so as to reinforce the flatter portions of the shell since these are not so stiff as the more sharply curved parts of the form.

After the upper and lower back panels have been conformed to the contour of the model and before they are removed, their longitudinal edges are trimmed in alignment. When these two conformed panels are united at their common circumferential edge, their longitudinal edges therefore make a continuous straight line as shown in Fig. 4.

The next step in the process consists in applying to the inner face of the shell thus provided a heat-resisting coating and preferably this may take the form of a water soluble compound, such as glue, starch, gelatine, dextrine or sodium silicate or a compound of such materials. A rubber ingredient such as latex and pigments may be added to this composition if desired. As only one example of a satisfactory compound for a heat-resisting coating, the following formula is set down in detail:

| | | |
|---|---|---|
| Lithopone | per cent | 31 |
| Revertex | do | 12 |
| Water | do | 15 |
| Casein solution {100 gr. casein, 600 gr. water, 30 cc. ammonia} | do | 9 |
| Sodium silicate—Bé. 40.5° | do | 31 |

To this may be added

| | | |
|---|---|---|
| French ochre | parts | 14 |
| English red oxide | do | 1 |

A solution of this formula may be applied by brushing or spraying, but in such manner as to leave an uncoated margin of about ¾" in the panels. The provision of an uncoated marginal band somewhat facilitates the later assembling and joining of the panels in forming an integral shell.

The two front panels 22 and 24 are similarly trimmed at their longitudinal edges and similarly provided with a heat-resisting coating as explained in connection with the back panels. The two shells thus formed are now united along their longitudinal edges to complete the dress form. The step of uniting the two half shells may be carried out in any desired manner. The overlapping edges may be fused together with a heated knife 26, as suggested in Fig. 5, or the edges may be overlapped and stapled or the edges may be butted and secured together by patches of the thermoplastic sheet material.

Having produced an integral shell in whatever manner may be selected the outer surface is provided with a heat-resisting coating similar to that which has already been applied to the inner surface and when this has dried both surfaces are provided with a further coating of lacquer. In this connection it should be noted that the heat-resisting coating already applied protects the thermoplastic material of the dress form against the solvent action of the lacquer which might soften it if the lacquer came in direct contact with the thermoplastic material. The exact composition of the lacquer is of secondary importance so long as it is of such character that it may be applied to the surface of the form as a continuous coating, filling depressions therein without tendency to bridge. For example, I might use an acetone solution of cellulose acetate, nitro-cellulose dissolved in ethyl acetate or ethyl cellulose dissolved in toluol. 16 ounces of cellulose acetate dissolved in approximately 1 gallon of acetone results in a lacquer which is entirely satisfactory. A satisfactory lacquer may also be made from heat-resisting resins of the non-reversible condensation type, such as some of the phenol-formaldehyde resins. No pigments need be added to the lacquer as it is transparent and allows the underlying coating to impart its color to the finished dress form. The heat-resisting effect of the lacquer may, however, be further improved by the addition of heat-reflecting materials, such as metal flakes, aluminum powder, etc. The lacquer is impervious to moisture and protects the resins in the thermoplastic material against oxidation over a period of years. There is therefore no change in the character of the protected dress form and no disintegration or appreciable loss of its pin-retaining property.

While advantageous results are obtained by the use of water soluble coatings alone, unique and unexepected results are found in the combination of heat-resisting and lacquer coatings, particularly when the underlying coating is a base of water soluble material and the overlying film consists of a lacquer made from a cellulose derivative. Possibly the desirable results flow from the unequal expansion and contraction of these two diverse films, but whatever the theory may be, the facts are that such a combination of coating or films serves to render the complete dress form impervious to any degree of heat that may be encountered in all practical conditions of storage and use.

The complete material of the dress form is illustrated somewhat diagrammatically in Fig. 8 wherein a sheet of knitted two-ply fabric 30 is represented as being impregnated and coated with layers 32 of thermoplastic material, and these in turn being coated with layers 34 of heat-resisting material beneath a film of lacquer. The ribbed character of the knitted goods 30 is clearly shown and this is visible to some extent in the finished sheet material. As already noted the panels of sheet plastic material are applied to the model with the ribs running horizontally so that the maximum stretch of the material is effective lengthwise of the model.

The order in which the panels are applied to the model may be varied if desired from that herein suggested. For example, the lower panels may be applied before the upper panels to take advantage of the supporting effect thus derived.

Having thus disclosed the process of my invention and described a preferred embodiment of the product thereof for purposes of illustration but not in any limiting sense, I claim as new and desire to secure by Letters Patent:

1. The process of making dress forms, which consists in providing a model with a close-fitting undergarment, heating flat panels of sheet thermoplastic material to render them plastic and adhesive, coating the heated panels with a soap solution, applying and conforming the heated and plastic panels one by one with overlapping edges to the model, the panels hardening in conformed shape and temporarily adhering to the undergarment, match marking the panels while thus held in place, removing the conformed and hardened panels, reassembling them off the model in accordance with the match marking, fusing them together in their original overlapped relation, and coating the form thus produced with a heat resisting film.

2. The process of making dress forms which is characterized by the steps of conforming heated plastic panels to a model having a close fitting undergarment, molding flat channels in the overlapping edges of the panels, causing the panels to adhere temporarily to the undergarment and to stiffen while thus held in place, removing the conformed and stiffened panels, and then fusing them together with the edge of one panel filling the channel of another.

3. The process of making dress forms which is characterized by a step of providing the model with a close fitting undergarment, applying and conforming heated plastic panels to the model with overlapping edges treated to prevent coherence, the panels being temporarily held in place by adhering to the undergarment and stiffening in conformed shape while so held, stripping the individual panels from the model, and then uniting them in original conformed relation.

4. The process of making dress forms which consists in heating and rendering plastic panels of thermoplastic sheet material, conforming the several heated panels to a model and causing them to harden in conformed shape thereon, applying a water soluble heat resisting coating to the conformed panels, and then covering said coating with a moisture resistant cellulose lacquer.

5. The process of making dress forms which consists in heating and rendering plastic panels of thermoplastic sheet material, conforming the several heated panels to a model and causing them to harden collectively in conformed shape thereon, and applying a water solution of lithopone, latex, casein and sodium silicate to the surface of each conformed panel.

6. The process of making dress forms which consists in heating and rendering plastic panels of thermoplastic sheet material, conforming the heated panels to a model and causing them to harden in conformed shape thereon, applying to both surfaces of the conformed panels a water solution of lithopone, latex, casein and sodium silicate, and then covering said coating with a moisture-resistant film of an acetone solution of cellulose acetate.

7. An improved dress form comprising a shell of thermoplastic sheet material conformed in contour to a model and provided with a water soluble heat-resisting coating covered by a moisture-resistant film of cellulose lacquer, said coating preserving self-healing characteristics in the material of the completed form.

8. An improved dress form comprising a shell of thermoplastic sheet material conformed in contour to a model and having a heat-resisting coating including in its composition lithopone, latex, casein and sodium silicate.

9. An improved dress form comprising a shell of thermoplastic sheet material conformed in contour to a model and having a heat-resisting coating including in its composition lithopone, latex, casein and sodium silicate covered with a moisture-resistant film of cellulose acetate.

10. An improved dress form having self-healing and pin retaining characteristics and comprising a shell of thermoplastic sheet material including in its composition candelilla wax, rubber, beeswax and resin, and having a surface coating of water soluble heat-resisting coating.

11. An improved dress form comprising a shell of thermoplastic material including in its composition a vegetable wax, rubber and resin and having a heat-resisting surface coating comprising lithopone, latex, casein and sodium silicate.

12. An improved dress form which is light, stiff, resilient and has self-healing, pin retaining characteristics, the form including in its composition a knitted fabric base saturated with a compound of vegetable wax, rubber, beeswax and resin, and having a heat-resisting coating which includes lithopone, and sodium silicate, and a surface film of moisture-resistant cellulose lacquer.

13. An improved dress form including in its structure a stretchable two-ply knitted base carrying a load of thermoplastic compound and conforming and stiffened in the contour of a model, a coating of heat-resistant material which is also impervious to organic solvents, and an outer film of moisture and vapor resistant material serving to protect the thermoplastic compound in the dress form against oxidation.

14. The process of making dress forms which includes the steps of heating and rendering limp panels of thermoplastic sheet material, conforming upper and lower panels to the back of a living model wearing a close fitting undergarment, causing them to harden in conformed shape thereon and to adhere slightly to the surface of said garment, trimming the longitudinal edges in alignment, removing the conformed and trimmed panels, uniting them in a back half shell, coating the interior of the back half shell with a heat-resisting material, and subsequently incorporating the back half shell with a similarly prepared front half shell in a complete dress form.

HARRY H. STRAW.